United States Patent [19]

Aguadisch et al.

[11] 3,764,545
[45] Oct. 9, 1973

[54] TRICHLOROETHYLENE EMULSION BASED CLEANING COMPOSITION

[75] Inventors: Leon Aguadisch, Sevres; Michel Mistou, Digne, both of France

[73] Assignee: Produits Chimiques PECHINEY-SAINT GOBAIN, Neuilly-sur-Seine, France

[22] Filed: May 27, 1971

[21] Appl. No.: 147,612

[30] Foreign Application Priority Data
May 29, 1970 France .............................. 7019739

[52] U.S. Cl........... 252/171, 252/DIG. 10, 252/311, 252/328
[51] Int. Cl............................................. C11d 7/52
[58] Field of Search....................... 252/171, 75, 78, 252/311, 321, 351, 358

[56] References Cited
UNITED STATES PATENTS

| | | | |
|---|---|---|---|
| 3,162,604 | 12/1964 | Michaels............................. | 252/171 |
| 3,352,790 | 11/1967 | Sugarman et al. .................. | 252/171 |
| 3,562,168 | 2/1971 | Wetmore et al. .................... | 252/171 |
| 3,577,348 | 5/1971 | Clementson ........................ | 252/171 |
| 3,255,108 | 6/1966 | Wiese .................................. | 252/76 |
| 3,004,923 | 10/1961 | Jurish.................................. | 252/321 |
| 3,341,467 | 9/1967 | Hwa................................... | 252/358 |

*Primary Examiner*—William E. Schulz
*Attorney*—McDougall, Hersh & Scott

[57] ABSTRACT

A composition and method for cleaning parts wherein the parts are contacted with a composition formulated to contain trichloroethylene, water, one or more oxyethylene alkyl phenol phosphate anionic emulsifiers and an acid salt derived from an alkenyl succinic acid or anhydride.

10 Claims, No Drawings

TRICHLOROETHYLENE EMULSION BASED CLEANING COMPOSITION

The present invention relates to trichloroethylene-based aqueous emulsion compositions and to the use of such compositions in the cleaning of surfaces formed of glass, refractory materials, synthetic polymers insensitive or inert toward trichloroethylene and particularly metals in the removal of dusts from such surfaces, such as dusts from the residue of polishing pastes containing inorganic fillers.

It is known that an aqueous emulsion of trichloroethylene containing an emulsifier or a cationic wetting agent can be used to eliminate the particles of dusts which dirty the metallic parts, especially those parts which have undergone a treatment by polishing pastes. It has been proposed to add to these emulsions, products which prevent tarnishing of the surfaces of parts and which increase the stability of the trichloroethylene aqueous emulsion, such as phenols, aliphatic or aromatic bases such as dibutyl amine, aniline and pyridine.

However, the known aqueous emulsions of trichlorethylene have serious disadvantages. These emulsions are composed of particles whose average size is greater than 4 microns, and, when, after cleaning, it is attempted to eliminate the residual emulsion on the treated part by means of such emulsions, there arises a difficulty in the complete elimination of this residue, since the relatively large size of these particles imparts to the emulsion a relatively high viscosity and consequently a bad flow of the liquid.

Moreover, the behavior of the metal parts, particularly of Zn, Al, Fe and Cu or their alloys such as ordinary steel, brass and bronze when exposed to such compositions is not satisfactory.

In effect, when there is carried out a test of resistance to attack of a Zn-Al-Mg alloy (having about from 95.6 to 96.1 percent by weight of Zn, from 3.9 to 4.3 percent by weight of Al and from 0.03 to 0.06 percent by weight of Mg) by a commercial emulsion composed of 25 to 30 percent by weight of trichloroethylene, 65 to 70 percent by weight of water, 0.1 to 2 percent by weight of ammonium oleate and from 0.5 to 1 percent by weight of ammonia, after 15 minutes contact of this allow with the aqueous emulsion at ordinary temperatures, there is observed a slight attack evidenced by a tarnishing of the immersed part of the alloy. Likewise, for copper and its alloys such as brass or bronze, after 15 minutes there is observed a very appreciable pickling due to a certain aggressivity of this emulsion towards these materials. Moreover, the cleaning efficiency of such metallic parts by means of this emulsion is very mediocre, especially towards polishing pasts which are difficult to eliminate on account of the insufficient activity of the emulsifier contained in the emulsion.

It is accordingly an object of the present invention to provide a composition and method for use in cleaning parts which is characterized by improved stability and cleaning efficiency in the removal of dusts and polishing pastes, which does not attack and/or pickel the surface treated, particularly surfaces formed of Al, Fe, Zn, Cu or their alloys, in a perceptible manner and which can be eliminated without difficulty from the treated surface.

The concepts of this invention reside in a composition in the form of an emulsion of the "water in oil" type comprising from 20 to 80 percent by weight of trichloroethylene, from 19.0 to 79 percent by weight of water, and from 0.5 to 15 percent by weight of one or more anionic emulsifiers selected from the group consisting of oxyethylene-alkyl-phenol phosphate containing from 2–12 molecules of ethylene oxide in which the alkyl groups of the alkyl-phenol contain 6–18 carbon atoms, and from 0.5 to 8 percent by weight of at least an acid salt derived from alkyl or alkenyl succinic anhydrides or acids, represented by the formula:

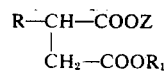

and/or that of its isomer:

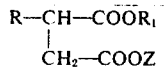

wherein R is a $C_8$ to $C_{24}$ alkyl or ethylenic hydrocarbon group, and $R_1$ is an ammonium cation; an alkali metal cation; a cationic radical of $C_1$ to $C_6$ saturated aliphatic primary or secondary mono-amines(e.g., alkyl amines such as methyl amine, dimethyl amine, ethyl amine, diethyl amine, propylamine, dipropylamine, butyl amine, pentyl amine, etc.), of an alkenyl primary or secondary mono-amine(e.g., allyl amine, diallyl amine, butenyl amine, etc.) of a $C_5$ to $C_{12}$ cycloaliphatic primary or secondary mono-amine(e.g., cyclopentyl amine, dicyclopentyl amine, cyclohexyl amine, dicyclohexyl amine, cycloheptyl amine, etc.), of a $C_6$, $C_{10}$, $C_{12}$ or $C_{20}$ aromatic primary or secondary mono-amine (e.g., aniline, diphenyl amine, naphthyl amine, etc.) or of a $C_7$ to $C_{16}$ primary or secondary alkylaryl mono-amine or arylalkyl mono-amine(e.g., xylylamine, xylidine, toluidine, benzylamine, phenylethylamine, dibenzylamine, benzylaniline, etc.); a cation radical of an amino alcohol selected from the group consisting of ethanolamine and diethanolamine; a pyridinium or piperidinium cation; or a cation of an amino acid selected from the group consisting of anthranilic acid, glycine and glutamic acid, and Z represents a hydrogen atom or a group of the formula:

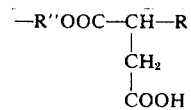

or its isomer:

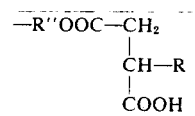

wherein R has the same meaning as set forth above and R" represents a divalent radical having an average molecular weight from 800 to 2200 derived from the group consisting of polyoxyethylenediol, polyethylenediol, polyoxypropylene-diol and polypropylene diol.

Representative examples of the radical R include octyl, nonyl, dodecyl, hexadecyl, eicosyl, 1,1-dodecenyl, tetrapropenyl, tributenyl, dibutenyl, hexabutenyl, tetraisobutenyl and 1-octenyl.

The preferred compositions of the invention are composed of from about 45 to 65 percent by weight of trichloroethylene, from about 25 to 50 percent by weight of water, from about 0.5 to 3.0 percent by weight of said oxyethylene alkylphenol phosphate and about from 1.0 to 5 percent of said succinic acid salt.

The preferred anionic emulsified of the invention is the oxyethylene nonylphenol phosphate having 6 molecules of ethylene oxide.

According to the practice of the invention, the composition can be prepared by first preparing a solution of the emulsifier and acid salt of the anhydride or succinic acid in trichloroethylene, and mixing these three component under agitation in the suitable proportions. Then, there is added to the resulting mixture a sufficient amount of water to obtain the hereinabove stated proportions.

Preferably the water used is deionized water or distilled water. Nevertheless, water up to 30 hydrotrimetric degrees can be used. Above, 30 hydrotrimetric degrees it is recommended to add to the hard water a known complexing agent, such as among others and without the following list being limitative: an alkali metal pyrophosphate, an alkali metal salt of tetraacetic ethylene diamine acid, or nitrilotriacetic acid.

The acid salt of the alkenyl succinic acid or anhydride can be obtained by the action of a mole of the acid or of the alkenyl succinic acid anhydride on a mole of the hydroxide of an alkali metal, of ammonia, of a $C_1$ to $C_6$ saturated or ethylenic primary or secondary aliphatic mono-amine, $C_5$ to $C_{12}$ cycloaliphatic, $C_6$ or $C_{10}$ aromatic, $C_7$ to $C_{16}$ alkylaromatic, of pyridine, of piperidine; of ethanolamine, of diethanolamine, of anthranilic acid, of glycine, of glutamic acid or an equivalent of the compound containing a polyfunctional alcohol, that is to say a compound containing the radical R''.

The preferred acid salt of the invention is ammonium tetrapropenyl succinate acid. In this case, this compound can be prepared by allowing to react under agitation a mole of tetrapropenyl succinic acid or anhydride on a mole of concentrated ammonia, for instance at about 28° Be. Gaseous ammonia can also be used by bubbling of this latter in said anhydride of said acid.

According to one embodiment, the acid salt can be prepared in the presence of trichloroethylene which plays the role of diluent. The amount of trichloroethylene to be used only has an influence on the viscosity of the reaction product. If a somewhat viscous reaction product is desired, a relatively small proportion of trichloroethylene is used, for instance, between 5 and 25 percent by weight based on the mixture of trichloroethylene with said acid salt. In contrast, if a low viscous reaction product is desired, from 25 to 80 percent by weight of trichloroethylene based on the weight of the mixture of trichloroethylene and of acid salt is used.

It has been found that the simultaneous presence of the acid salt of the succinic anhydride or acid and of the oxyethylene alkyl phenol phosphate in the aqueous emulsion of trichloroethylene, imparts to this latter the following properties:

the emulsion has a pH ranging from 6.5 to 7, whereas an emulsion formulated entirely with oxyethylene alkyl phenol phosphate without the alkenyl succinic acid salt has a pH ranging from 2 to 3, the latter being detrimental to the cleaning of certain metals, such as Al and/or its alloys;

the stability in storage of the emulsion at rest is very efficient. After 250 hours, only 2 $cm^3$ of trichloroethylene separate out(decant) for a total volume of 500 $cm^3$ of emulsion, whereas without the acid salt, the decantation of trichloroethylene is in the order of 160 $cm^3$ after 250 hours;

the average size of 90 percent of the emulsion particles measured by means of a microscope is less than 1 micron, whereas without the acid salt, only from 45 to 50 percent on the particles have an average size less than 1 micron;

the alloy of Zn-Al-Mg (Zn: from 95.6 to 96.1 percent; Al: from 3.9 to 4.3 percent; and Mg; from 0.03 to 0.06 percent by weight respectively) is not pickled during the immersion of this alloy into the emulsion for more than 2 hours, whereas in the absence of the acid salts in the aqueous emulsion, there is a tarnishing of the alloy after an immersion of 15 minutes.

The cleaning process of the invention for the removal of dusts and/or polishing pastes soiling the parts is carried out by contacting said parts with said compositions of the invention, for instance, by spraying, by aspersion and most frequently by immersion of said parts into said compositions. In this last case, it is helpful to stir the liquid bath. The stirring of the bath is carried out according to any known means per se and preferably by mechanical stirring, by pumping or by ultrasounds. The contact time of the soiled parts with the stirred liquid bath generally varies between 30 seconds and 5 minutes, but sometimes it may be prolonged up to 10 minutes according to the nature of the impurity which soils the parts.

The cleaning of the parts is followed by water rinsing, liquid trichloroethylene rinsing or by means of a water repellent (dewatering) trichloroethylene-based composition at room temperature, and then the parts are subjected to drying in an atmosphere of trichloroethylene vapors. The rinsing operation can be omitted and the parts can be treated directly with trichloroethylene in the vapor phase as soon as they leave the emulsion bath.

In the course of the cleaning operations, the emulsion of the invention becomes loaded up with greases, dusts and inorganic materials so that the efficiency of the cleaning decreases, and it is then preferable to renew the emulsion. It is possible to recover the trichloroethylene from the spent emulsion by separating the emulsion by means of a water-soluble salt, such as the alkali-metal chlorides, nitrates or sulfates; ammonium, and aluminum chloride; alkaline-earth metal and Mg nitrates. Two layers separate out: the lower layer of trichloroethylene and the upper layer of water. The layer of trichloroethylene is removed and distilled, thus permitting recovery of a clean trichloroethylene, the pH of which is from 7.5 to 8.

Having described the basic concepts of the invention, reference is now made to the following examples which are provided by way of illustration, and not by way of limitation, of the practice of the invention. Amounts hereinafter stated are expressed as percent by weight.

EXAMPLES OF COMPOSITIONS

| Examples | Tri-Chloro-ethylene | Ammonium tetra-propenyl suc-cinate | Oxyethylene alkyl (nonyl) phenol phosphate with 6 molecules of ethylene oxide | Water |
|---|---|---|---|---|
| 1 | 56.4 | 1.6 | 1.2 | 40.8 |
| 2 | 56.8 | 1.6 | 0.6 | 41.0 |

| | | | | | |
|---|---|---|---|---|---|
| 3 | 53.6 | 2.9 | | 1.7 | 41.8 |
| 4 | 52.6 | 2.8 | | 1.7 | 42.9 |
| 5 | 50.5 | 2.7 | | 1.6 | 45.2 |
| 6 | 54.3 | 2.6 | | 1.5 | 41.6 |
| 7 | 58.0 | 3.1 | | 1.8 | 37.1 |
| 8 | 60.0 | 3.2 | | 1.9 | 34.9 |
| 9 | 55.0 | 3.0 | | 1.7 | 40.3 |
| 10 | 62.0 | 3.3 | | 1.9 | 32.8 |

CLEANING EXAMPLES Example 11

Various parts made of steel, aluminum, copper, brass, bronze and zamac (alloy Zn - Al - Mg: from 95.6 to 96.1 — from 3.9 to 4.3 — from 0.03 to 0.06 percent by weight, respectively) soiled by residues of polishing pastes are immersed into a stainless steel vat equipped with a stirrer and filled with the composition of Example 1. The contact is maintained for 4–5 minutes at room temperature. The parts are withdrawn, and are water rinsed, after which they are dried in an atmosphere of trichloroethylene vapors.

As a result of this treatment, the parts are perfectly clean.

EXAMPLE 12

Aluminum made articles soiled by residues of polishing pastes are immersed into a vat filled with the composition of Example 3. These parts are allowed to remain in contact with the bath for 1 minute at room temperature. Afterwards, the parts are withdrawn and they are rinsed with water under pressure, then dried in an atmosphere of trichloroethylene vapors. As a result of this treatment, these articles are perfectly clean.

EXAMPLE 13

Stainless steel parts soiled by dusts and polishing pastes are treated in a bath containing the composition of Example 8 and stirred by means of ultrasounds. The cleaning time is about 4 minutes; the parts are then rinsed with water under pressure, and afterwards dried in the vapor phase of trichloroethylene. The articles are then perfectly clean.

EXAMPLE 14

Copper parts are treated for 1 minute in a bath filled with the composition of Example 3 and mechanically stirred. The withdrawn parts are then rinsed, and completely dried in the vapor phase of trichloroethylene. At the end of this cycle, cleaning is achieved in an impeccable manner.

COMPARISON TESTS

In a first comparative test, an emulsion which is outside the scope of the invention, and having the following composition express by weight was prepared (the alkylphenol used was a nonylphenol).

| | |
|---|---|
| Water | 81.0% |
| Trichloroethylene | 14.0% |
| Ammonium tetrapropenyl-succinate acid | 3.1% |
| Oxyethylene alkyl phenol phosphate having 6 molecules of ethylene oxide | 1.9% |

Various parts made of steel, aluminum, copper, brass, bronze and zamac which were soiled by residues of polishing pastes were immersed into a stainless steel vat equipped with a stirrer and filed with the above composition. The parts were allowed to stay in contact with said composition for 4–5 minutes at room temperature. The parts were then withdrawn and water rinsed, after which they were dried in an atmosphere of trichloroethylene vapors. It was observed that after this treatment the parts were dustless, but their surfaces were covered with a film of fatty substances which originate from the polishing paste composition.

In a second comparative test, an emulsion having the following composition expressed by weight was prepared:

| | |
|---|---|
| Water | 10.0% |
| Trichloroethylene | 85.0% |
| Ammonium tetrapropenyl-succinate acid | 3.1% |
| Oxyethylene alkylphenol phosphate having 6 molecules of ethylene oxide | 1.9% |

The above composition was used in a cleaning test identical to the previous comparison test. It was observed after the cleaning treatment that the parts were soiled with dust although the surfaces of these parts were suitably degreased.

In a third comparative test, an emulsion having the following composition was prepared:

| | |
|---|---|
| Water | 41.8% |
| Trichloroethylene | 53.6% |
| Oxyethylene alkylphenol phosphate having 6 molecules of ethylene oxide | 4.6% |
| Ammonium tetrapropenyl-succinate acid | — |

The following test was performed: a polishing paste which had already been used was introduced into 500 cm³ of the above composition.

The polishing paste had the following composition expressed by weight:

| | |
|---|---|
| Polishing paste | 62% |
| Aluminum powder | 27% |
| Kerosene | 6% |
| Various oils | 5% |

The polishing paste composition was allowed to stand in contact with the said emulsion during 250 hours. It was then observed that 250 cm³ of water of the emulsion separated out and that the emulsion was broken. As a reference blank, 500cm³ of the above emulsion which had not been contacted with the already used polishing paste was also allowed to stand for 250 hours. It was observed that 160 cm³ of water separated out of the emulsion.

The composition of Example 3 above was submitted to the same treatment with the polishing paste as just described. It was observed that after 250 hours contact time, only 30 cm³ of water separated out of the emulsion.

Again with the composition of Example 3 but which was not contacted with the polishing pastes and only allowed to stand during 250 hours, it was observed that only 2 cm³ of water separated out of the emulsion.

It was therefore seen that the stability during storage of the emulsion composition of the invention was far superior than an emulsion composition which does not contain any ammonium tetrapropenylsuccinate acid.

It will be understood that various changes and modifications can be made in the details of formulation, procedure and use without departing from the spirit of the invention, especially as defined in the following claims.

We claim:

1. A composition in the form of an emulsion of the water in oil type of water in trichloroethylene, which consisting essentially of from 20 to 80 percent by weight of trichloroethylene, from 19.0 to 79 percent by weight of water, from 0.5 to 15 percent by weight of one or more anionic emulsifiers selected from the group consisting of oxyethylene alkyl phenol phosphates containing from 2 to 12 molecules of ethylene oxide in which the alkyl group of said alkyl phenol has from 6–18 carbon atoms, and from 0.5 to 8 percent by weight of at least an acid salt derived from alkyl or alkenyl succinic anhydrides or acids represented by the formula:

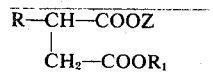

and/or that of its isomer:

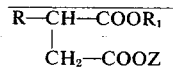

wherein R is a $C_8$ to $C_{24}$ alkyl or ethylenic hydrocarbon group and $R_1$ is selected from the group consisting of an ammonium cation, an alkali metal cation, a cationic radical of a $C_1$ to $C_6$ saturated aliphatic primary or secondary mono-amine, an alkenyl primary or secondary mono-amine, a $C_5$ or $C_{12}$ cycloaliphatic primary or secondary mono-amine, a $C_6$, $C_{10}$, $C_{12}$ or $C_{20}$ aromatic primary or secondary mono-amine or a $C_7$ to $C_{16}$ primary or secondary alkylaryl mono-amine or arylalkyl mono-amine; a pyridinium or piperidinium cation; a cationic radical of amino-alcohol selected from the group consisting of ethanolamine and diethanolamine; a cationic radical of an amino-acid selected from the group consisting of anthranilic acid, glycine and glumatic acid; Z represents a hydrogen atom, a group having the formula:

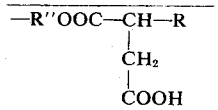

or its isomer:

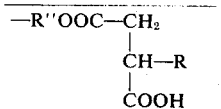

in which R has the same meaning as hereinabove and R'' represents a radical having an average molecular weight from 800 to 2200 derived from the group consisting of polyoxyethylene-diol, polyethylene-diol, polyoxypropylene-diol and polypropylene-diol.

2. A composition as defined in claim 1 which comprises from about 45 to 65 percent by weight of trichloroethylene, from about 25 to 50 percent by weight of water, from about 0.5 to 3.0 percent by weight of the anionic emulsifier and from 1 to 5 percent by weight of the acid salt derived from succinic anhydrides or acids.

3. A composition as defined in claim 1 wherein the anionic emulsifier is oxyethylene nonyl-phenol phosphate having 6 molecules of ethylene oxide.

4. A composition as defined in claim 1 wherein R is selected from the group consisting of 1-dodecenyl, tetrapropenyl, tributenyl, dibutenyl, hexabutenyl, tetraisobutenyl and 1-octenyl.

5. A composition as defined in claim 1 wherein said acid salt is ammonium tetrapropenyl-succinate acid.

6. A composition as defined in claim 1 wherein R is selected from the group consisting of octyl, nonyl, dodecyl, hexadecyl and eicosyl.

7. In the method for the cleaning of parts which are inert to the action of trichloroethylene for the removal of dusts and residues from polishing pastes, the improvement comprising contacting the parts with a composition as defined in Claim 1 and rinsing and drying the parts.

8. A process as defined in claim 7 wherein the parts are contacted with the composition for a period of one-half minute to 10 minutes.

9. A process as defined in claim 7 wherein said parts are contacted with the composition by immersion in the composition, with the liquid bath being agitated.

10. A process as defined in claim 7 which includes the steps of rinsing the parts subsequent to contact with the composition with a material selected from the group consisting of water, liquid trichloroethylene and a water-repellent trichloroethylene based composition at room temperature and then drying the parts in an atmosphere of trichloroethylene vapor.

* * * * *